United States Patent [19]

Nakamura et al.

[11] 3,938,724
[45] Feb. 17, 1976

[54] METHOD OF MAKING BUTT WELDED TUBES

[75] Inventors: Takao Nakamura, Yokohama; Itsuo Hirose, Kamakura; Rokuro Misawa, Yokohama; Hidenori Horii, Yokohama; Akira Hagio, Yokohama; Tetsuo Sada, Yokohama, all of Japan

[73] Assignee: Nippon Kokan Kabushiki Kaisha, Tokyo, Japan

[22] Filed: June 29, 1973

[21] Appl. No.: 375,174

Related U.S. Application Data

[63] Continuation-in-part of Ser. No. 129,902, March 31, 1971, abandoned.

[52] U.S. Cl. ............... 228/147; 228/17.5; 228/231; 228/240
[51] Int. Cl.² ........................ B23K 9/00; B23K 9/02
[58] Field of Search ............... 29/477.7, 487, 498.5; 228/17.5, 147, 231, 240

[56] References Cited
UNITED STATES PATENTS

| | | |
|---|---|---|
| 1,828,977 | 10/1931 | Miller .................................. 29/487 |
| 2,188,326 | 1/1940 | Windsor et al. ..................... 29/477.7 |
| 2,673,276 | 3/1954 | Allardt................................. 29/487 |
| 2,796,508 | 6/1957 | Holman et al. ..................... 29/477.7 |
| 3,069,763 | 12/1962 | Reynolds ........................ 29/477.7 X |
| 3,118,406 | 1/1964 | Stanton........................... 29/477.7 X |
| 3,332,138 | 7/1967 | Garner............................ 29/477.7 X |
| 3,350,771 | 11/1967 | Durst .............................. 29/477.7 X |
| 3,590,622 | 7/1971 | Elge et al........................ 29/477.7 X |

*Primary Examiner*—Francis S. Husar
*Assistant Examiner*—Carl Rowold
*Attorney, Agent, or Firm*—William Anthony Drucker

[57] ABSTRACT

A butt welded tube is provided having excellent properties by the steps of forming a skelp onto a round shape, butt welding the edges thereof with butt welding rolls, blowing oxygen or air into the weld zone, so that said zone is brought to a melted condition with oxidizing heat based on said blowing and some notches which are formed are blown off with said blowing, and then said tube is passed through a train of reducing rolls to obtain a smooth surface and the required dimension of said tube.

5 Claims, 6 Drawing Figures

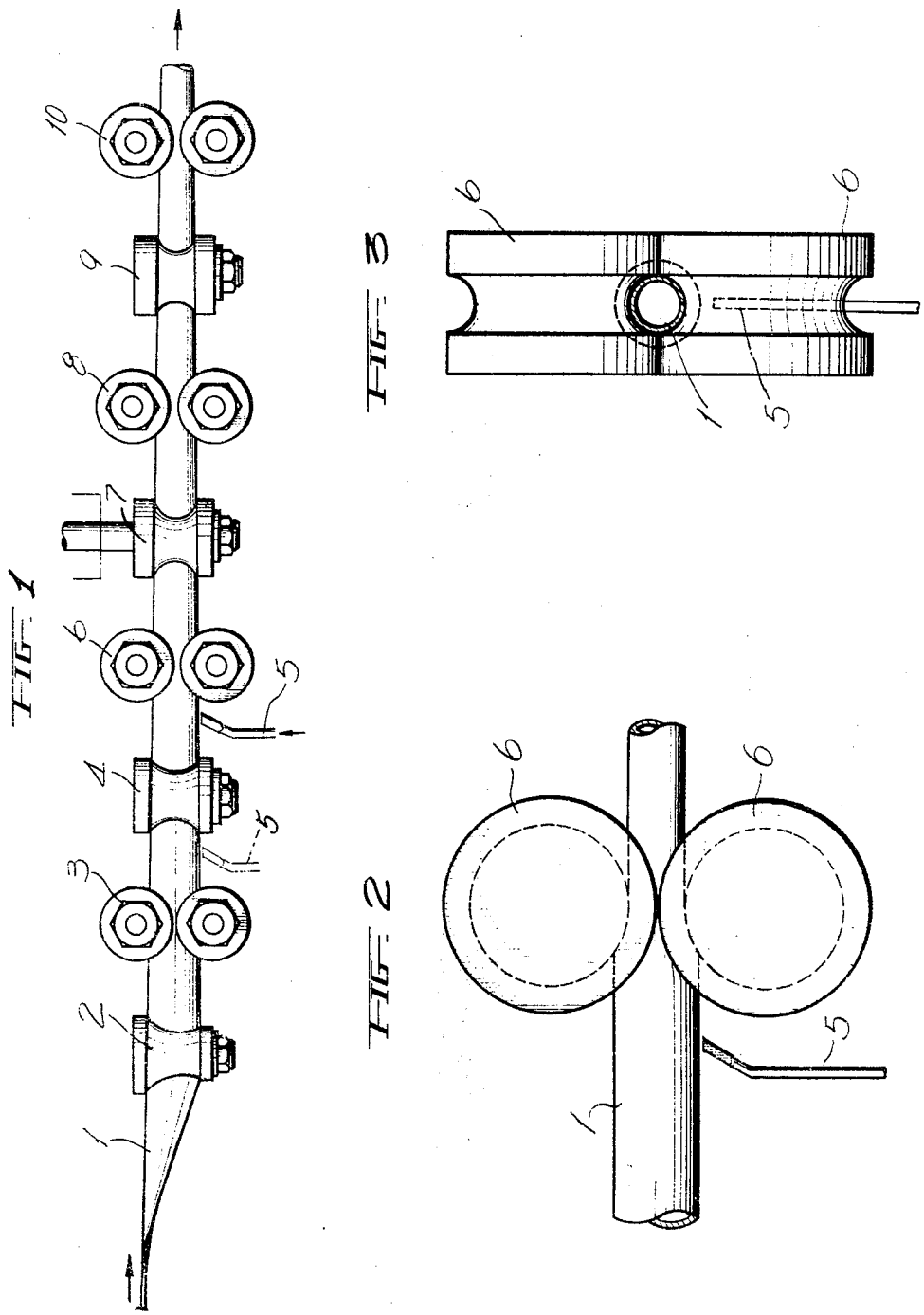

METHOD OF MAKING BUTT WELDED TUBES

The present application is a continuation-in-part of our copending application Ser. No. 129,902 filed Mar. 31, 1971, now abandoned.

BRIEF EXPLANATION

The invention relates to a method of making butt welded tubes and provides such a method which considerably decreases the notches occuring on the butt welded edge to increase the strength and thus to obtain products of high value.

The prior practices comprise heating skelps up to a high temperature, forming them into round shapes, feeding the shapes thereafter to the butt welding rolls to butt weld the edges thereof, and thus produce steel tubes. In the prior art, oxygen of air is blown to the weld zone (edges of the skelps) to provide good butt welding. That is, just before butt welding the oxygen or the air is blown to the weld zone to increase the temperature for the butt welding operation. However by such a method the edges of the skelps become round, and partially melting edges are destroyed by contacting, before butt welding, the calibers of the butt welding rolls, and since the butt welding is performed thereon as they are destroyed, notches remain on the inner and outer surfaces of the produced tubes. Those notches decrease the strength of the value of the products.

The present invention has been conceived to eliminate those shortcomings. After forming skelps in a round shape and butt welding the same, oxygen or the air is blown to the welding zone of the tubes, and thereafter the tubes are passed through a train of reducing rolls. According to the invention, the weld zone in which the temperature is increased by the oxidizing heat, is pressed by the rolls to swell the notch parts on the outer surface. The melting welding zone melts notches to make the surface flat and in this manner lots of notches are greatly decreassed.

The present invention is for obtaining the production of a tube having a smooth region in the butt weld. The skelp which has been heated up to the desired temperature for the butt welding operation in the heating furnace, formed into a round shape with the forming rolls and passed through the butt welding rolls, acquires, when the edges thereof are butted, on its butt welded region protruding an ear or part or a groove or concave formed by rounding the edges due to the high temperature in the furnace. The prior practices as mentioned hereinbefore comprise forming a skelp into a round shape to face the edges opposite each other, and blowing oxygen or the air to heat up the edges owing to the oxidizing heat so that said edges are brought into a melting or softening condition for butt welding and thereafter the thus treated tube is passed through a train of reducing rolls. That is to say, prior to the butt welding, the oxygen or air is blown to provide a good butt welding. Therefore notches such as an ear or concave are inevitably generated and since the tube as it is, is passed through the reducing rolls, notches remain on the butt welded zone of the product to result in decreasing the strength of the tube and lowering its valve. In contrast, the blowing of the oxygen or air in the present invention is to eliminate the notches. That is to say, after the butt welding the oxygen or air is blown to the butt welding zone. As is seen, the blowing of the oxygen or air of the invention is different from the prior practices in the object thereof. In this connection, the invention and the prior practices both blow the oxygen or air, and the zone blown therewith is heated up to a temperature of around 1300°C by the oxidizing heat and cause the melting or softening condition. In the present invention, in such a manner, notches are softened or melted and concurrently blown off.

It is well known that the heated part of the tube is further heated by blowing oxygen or air thereon on the same principle that a charcoal fire is heated up by blowing therein.

Other features or working effects of the invention will be apparent from the explanation of the embodiments.

BRIEF EXPLANATION OF THE DRAWINGS

FIG. 1 is a side view showing an apparatus according to the invention;

FIG. 2 is a side view showing the arrangement of a nozzle for blowing oxygen to the weld zone;

FIG. 3 is the front view of FIG. 2;

FIGS. 4 and 4a are graphs showing the grades of butt welded tube in which the tube making speeds are variously changed in accordance to the present method to control the pressure of the blowing oxygen wherein FIG. 4 shows expanding rates, and FIG. 4a shows improvements of flattening rates.

DETAILED EXPLANATION

Figure 4:
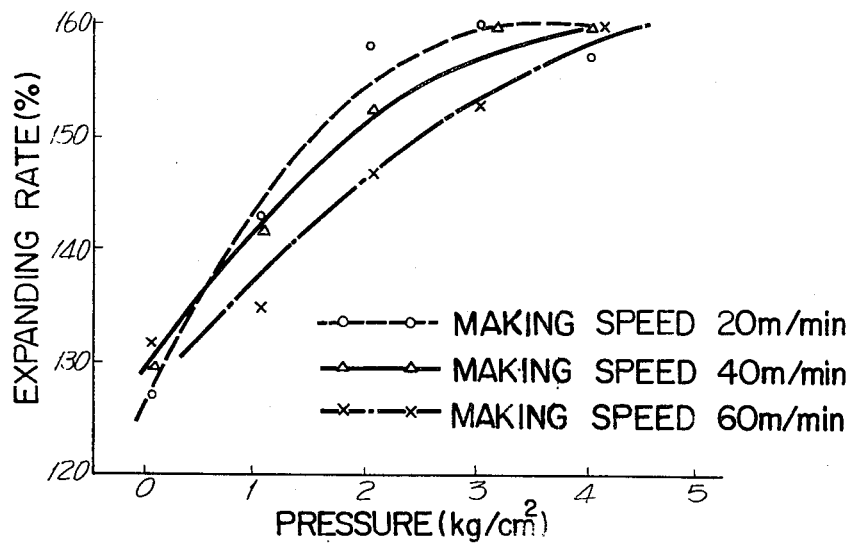

To explain the actual structure and the working effects of the invention with reference to the accompanying drawing, a skelp 1 which is generally heated in a heating furnace advances in the direction of the arrow as shown in FIG. 1. In such a case, the skelp is compressed from the right and left sides by the forming rolls 2, with its edges being forced down, to form it almost into a round shape, and when passing through butt welding rolls 3 both edges are completely butt welded, and then the tube further advances to the train of reducing rolls 4 and 6 to 10.

Immediately after having passed through the first reducing rolls 4, a nozzle 5 blows oxygen or air to the weld zone along the butt welding line. In this connection, this nozzle 5 may be placed between the butt welding rolls 3 and the reducing rolls 4 as shown in broken lines in FIG. 1. The butt welded seam is blown with oxygen or air, and said notches on the seam are melted by said oxidizing heat, and the molten notches are subsequently blown off by the blowing pressure, and the tube without notches is passed through the reducing rolls 6, 7, 8, 9 and 10 or the reducing rolls 4, 6, 7, 8, 9 and 10 to reduce the tube from the right and left sides as well as up and down to a desired diameter of the tube produced, and eliminate notches, thereby producing a tube without a weld seam.

Furthermore, the nozzel 5 is not always placed at the rear of the butt welding rolls 3 or the reducing rolls 4 but can be positioned after the drawing rolls 6 or the subsequent rolls, and there may be a number of such nozzles.

The following table shows the testing results of the invention.

| Testing Results | | (Rectangular nozzle) | |
|---|---|---|---|
| Conditions | | Values of characteristic properties | |
| Making speed | Pressure of blowing oxygen | Flattening rate | Expanding rate |
| 20m/min | 0Kg/cm² | 75% | 127% |
| '' | 1 | 90 | 143 |
| '' | 2 | 100 | 158 |
| '' | 3 | 100 | 160 |
| '' | 4 | 100 | 157 |
| 40m/min | 0 | 79 | 130 |
| 41 | 1 | 85 | 142 |
| 41 | 2 | 97 | 152 |
| '' | 3 | 100 | 160 |
| '' | 4 | 100 | 160 |
| 60m/min | 0 | 73 | 132 |
| '' | 1 | 79 | 135 |
| '' | 2 | 90 | 147 |
| 41 | 3 | 97 | 153 |
| '' | 4 | 100 | 160 |

Figure 4A:
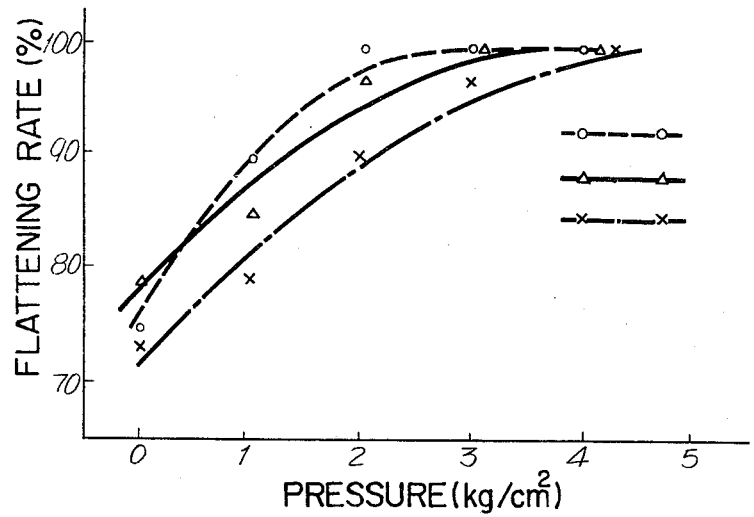

In the present method, when blowing the oxygen to notches on the outer surface, the expanding and flattening effects depend of course on the pressure of the blowing oxygen. However, as is apparant from the above results even if the pressure is 1 Kg/cm² the effects are well brought about in their own way. FIG. 4 shows in graph form the relationships between the pressure of blowing the oxygen when the invention was practised under the same conditions as in said testing results, and the expanding rate as well as the flattening rate reach almost the limit with a pressure of around 5 Kg/cm² in both tube making speeds, and they draw the parallel lines with that of above 7 Kg/cm². In this embodiment a nozzle of rectangular form was used, but the results are not changed with nozzles of oblong, ellipse or circle forms. The tube making speeds influence the expanding and flattening effects on notches,. and as shown in FIG. 4 and FIG. 4a the most effective results are obtained when the tube making speed is above 20m/min or less but when the pressure of blowing the oxygen is above 5 Kg/cm², especially 7 Kg/cm² the flattening and expanding rates are good even if the tube making speed becomes fairly high.

Figure 5:
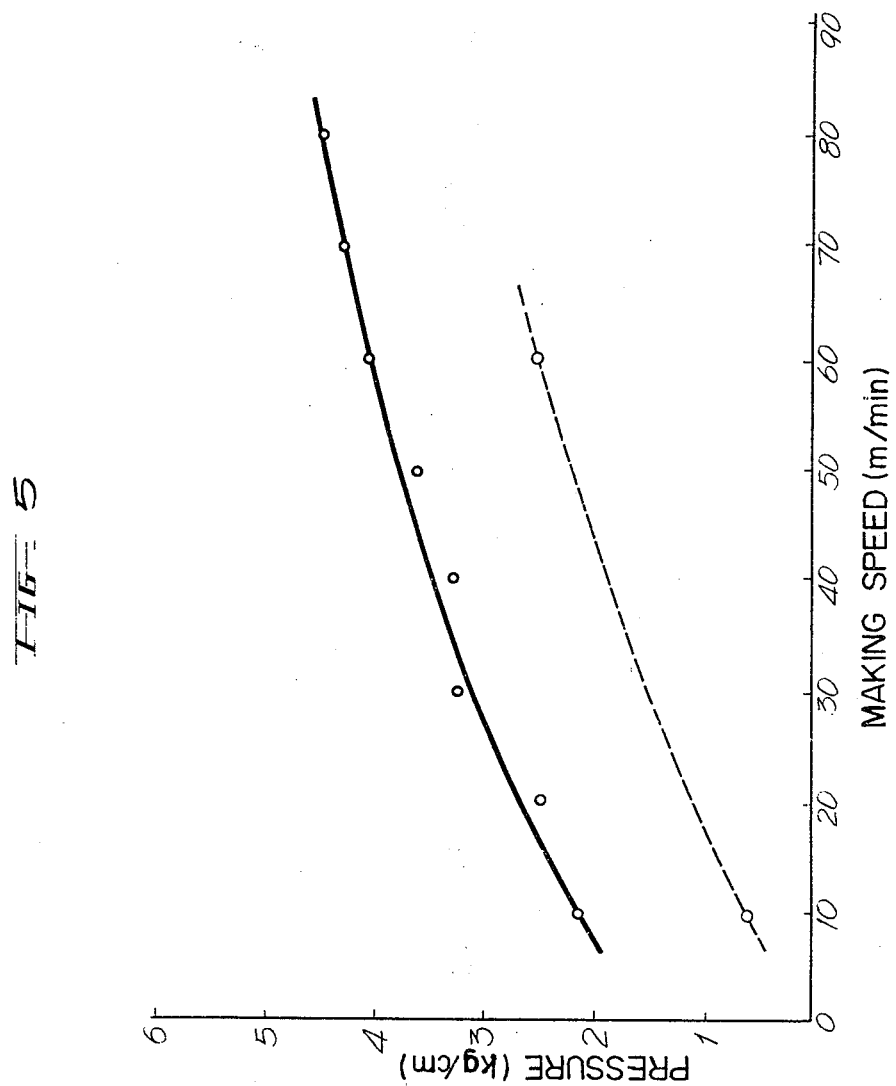
FIG. 5 is a graph showing the relationship between the tube making speed, and the pressure of blowing oxygen when the invention is put into practice.
Figure 6:
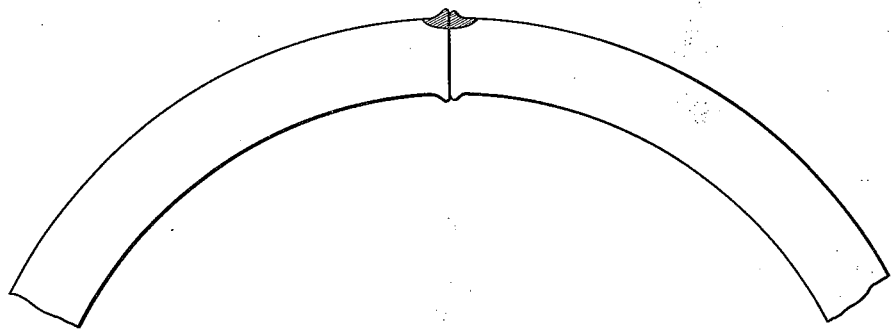
Figure 7:
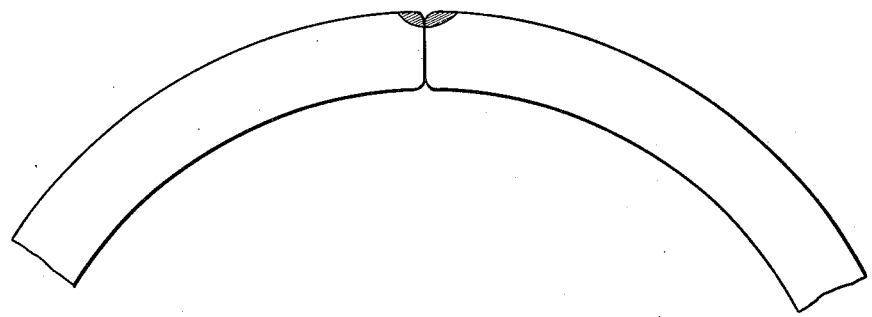
Figure 8:
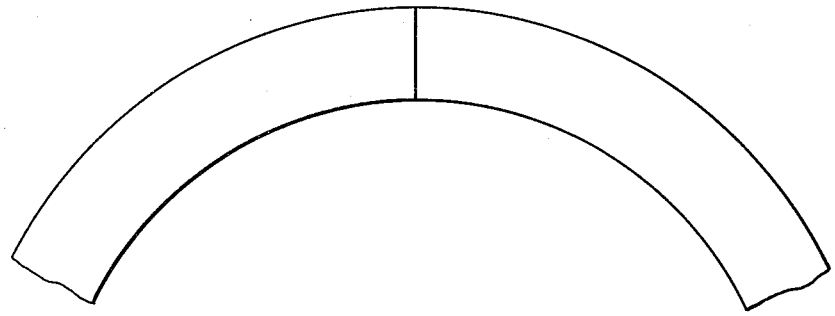

The decreasing effect of the notches is more or less influenced by the size of a tube to be butt welded, tube making speed, pressure of blowing oxygen, purity of basic metal and others, and FIG. 5 is one example showing the optimum relationship between the pressure of the blowing oxygen and the tube making speed for removing notches, and even in the case of the tube making speed being e.g. 10 m/min a substantially good result was obtained with the pressure of blowing oxygen being 0.5 Kg/cm², and generally the operation takes place with a pressure of above 0.5 Kg/cm² and the speed of above 10 m/min.

The present method blows the oxygen or the air just after butt welding, so that notches on the butt welded tubes are decreased as shown in the following table to considerably incrase the strength of the tube. The term "oxygen" as used herein means "air" or oxygen

| | Depth of notch on outer surface | Flattening rate | Expanding rate | Faults by E.D.D. |
|---|---|---|---|---|
| Blowing oxygen after forming by butt welding | 0.0mm | 100% | 160% | 0.12% |
| Not blowing oxygen after forming by butt welding | 0.05mm | 74% | 137% | 0.62% |

Faults were detected by Eddy current flaw detector or Non-destructive Inspection

We claim:

1. In a method of making butt welded tubes of oxidizable material comprising heating a skelp to a temperature suitable for butt welding of the material, passing the heated skelp between forming rolls to form it into a tube having longitudinal edge positions bounding an open seam, and passing said open-seam tube between butt-welding rolls to cause said longitudinal edge portions to become butt welded, the improvement of blowing oxygen under pressure onto said butt welded edge portions, whilst they are at a temperature at which oxidation will occur, thereby to cause increase of temperature of said edge portions and result in removal by oxidation and blowing away of protrusions formed during the butt welding, and whilst said butt welded edge portions are at increased temperature passing said tube through reducing rolls to produce a substantially seamless tube.

2. A method, as claimed in claim 1, wherein, after butt welding of said edge portions and after said step of blowing oxygen onto said butt welded edge portions, said tube is passed between reducing rolls.

3. A method, as claimed in claim 1, wherein the steps are carried out to form the tube at a speed of above 10 metres per minute, and wherein the oxygen is blown onto the butt welded edge portions, at a pressure above 0.5 Kg/cm².

4. A method, as claimed in claim 1, wherein said tube is passed through a plurality of stages of reducing rolls.

5. A method, as claimed in claim 1, wherein the steps are carried out to form the tube at a speed within the range 20 to 60 metres per minute inclusive, and wherein the oxygen is blown onto the butt welded edge portions at a pressure above 5 Kg/cm².

* * * * *